US010749882B2

(12) United States Patent
Grothendieck et al.

(10) Patent No.: US 10,749,882 B2
(45) Date of Patent: Aug. 18, 2020

(54) NETWORK SECURITY SYSTEM AND METHODS FOR ENCODING NETWORK CONNECTIVITY FOR ACTIVITY CLASSIFICATION

(71) Applicant: Raytheon BBN Technologies Corp., Cambridge, MA (US)

(72) Inventors: John Grothendieck, Columbia, MD (US); Ilana Heintz, Silver Spring, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 203 days.

(21) Appl. No.: 15/957,221

(22) Filed: Apr. 19, 2018

(65) Prior Publication Data
US 2019/0327252 A1  Oct. 24, 2019

(51) Int. Cl.
  *H04L 29/06* (2006.01)
  *G06N 3/08* (2006.01)
  *G06N 3/04* (2006.01)
  *H04L 29/08* (2006.01)

(52) U.S. Cl.
  CPC ......... *H04L 63/1425* (2013.01); *G06N 3/084* (2013.01); *H04L 63/1416* (2013.01); *G06N 3/04* (2013.01); *H04L 67/02* (2013.01)

(58) Field of Classification Search
  CPC . H04L 63/1425; H04L 63/1416; H04L 67/02; G06N 3/084; G06N 3/04
  See application file for complete search history.

(56) References Cited

U.S. PATENT DOCUMENTS

| 8,010,469 | B2* | 8/2011 | Kapoor | G06F 9/505 706/20 |
| 8,762,298 | B1* | 6/2014 | Ranjan | G06N 5/02 706/12 |
| 9,516,053 | B1* | 12/2016 | Muddu | G06N 5/022 |
| 10,003,483 | B1* | 6/2018 | Migliori | G06N 3/0454 |
| 10,242,665 | B1* | 3/2019 | Abeloe | G10L 13/047 |

(Continued)

OTHER PUBLICATIONS

International Search Report and Written Opinion in application No. PCT/US2019/026875 dated Jun. 27, 2019.

*Primary Examiner* — Joseph P Hirl
*Assistant Examiner* — Stephen T Gundry
(74) *Attorney, Agent, or Firm* — Lando & Anastasi, LLP (57) ABSTRACT

Aspects are generally directed to network security systems and methods of monitoring network activity. In one example, a network security system includes and interface to receive a Hypertext Transfer Protocol (HTTP) network log that includes a matrix of data, a feature extraction component configured to extract a connectivity matrix from the HTTP network log based on a recurring pattern within the matrix of data, and a training module configured to provide deep learning architecture training data based on the connectivity matrix. The system may include a deep learning architecture configured to receive and propagate the training data through one or more layers thereof to train the one or more layers, and being configured to generate a general data representation of the HTTP network log. The system may include a behavior analytics component to detect a discordant network activity within the HTTP network log based on the general data representation.

12 Claims, 7 Drawing Sheets

(56) References Cited

U.S. PATENT DOCUMENTS

| | | | |
|---|---|---|---|
| 2015/0373039 A1* | 12/2015 | Wang | H04L 63/1425 |
| | | | 726/23 |
| 2016/0359680 A1* | 12/2016 | Parandehgheibi | G06F 3/0482 |
| 2017/0076170 A1* | 3/2017 | Tuzel | G06K 9/40 |
| 2018/0063168 A1* | 3/2018 | Sofka | H04L 63/1416 |
| 2018/0144246 A1* | 5/2018 | Jayadeva | G06N 3/0454 |
| 2018/0165554 A1* | 6/2018 | Zhang | G06K 9/6269 |
| 2018/0191748 A1* | 7/2018 | McGrew | H04L 69/02 |
| 2018/0278197 A1* | 9/2018 | Kubo | G06N 3/084 |
| 2019/0166141 A1* | 5/2019 | Xu | G06N 3/0472 |
| 2019/0199736 A1* | 6/2019 | Howard | G06N 3/084 |
| 2019/0207966 A1* | 7/2019 | Vashisht | G06F 16/285 |
| 2019/0207976 A1* | 7/2019 | Yadav | H04L 63/20 |
| 2019/0245866 A1* | 8/2019 | Anderson | G06N 20/00 |
| 2019/0253435 A1* | 8/2019 | Machlica | H04L 61/1511 |
| 2019/0260775 A1* | 8/2019 | Bartos | H04L 63/1425 |
| 2019/0260781 A1* | 8/2019 | Fellows | G06K 9/622 |
| 2019/0297108 A1* | 9/2019 | Johnston | H04L 63/20 |

* cited by examiner

FIG. 1

|  | Destination IP X | Destination IP Y | Destination IP Z | ... | ... | ... |
|---|---|---|---|---|---|---|
| Source IP A | 300 kb at 12/10/2017 12:10 | 200 kb at 12/10/2017 14:10 | 0 | ... | ... | ... |
| Source IP B | 250 kb at 12/10/2017 08:05 | 300 kb at 12/10/2017 08:50 | 400 kb at 12/10/2017 09:15 | ... | ... | ... |
| Source IP C | 100 kb at 12/10/2017 16:30 | 200 kb at 12/10/2017 14:40 | 300 kb at 12/10/2017 18:00 | ... | ... | ... |
| ... | ... | ... | ... | ... | ... | ... |
| ... | ... | ... | ... | ... | ... | ... |
| ... | ... | ... | ... | ... | ... | ... |

NETWORK SECURITY SYSTEM AND METHODS FOR ENCODING NETWORK CONNECTIVITY FOR ACTIVITY CLASSIFICATION

BACKGROUND

Hypertext Transfer Protocol (HTTP) is an application protocol for exchanging or transferring hypertext. HTTP is a stateless protocol that permits communication between a variety of clients and hosts. In particular, HTTP is a request-response protocol by which a client submits an HTTP request, and a host returns a response. Often the host provides a message, content, or other functionality for the client. In many cases, HTTP network logs may be generated to track one or more aspects of communication between a client and a host. In particular, HTTP network logs may include internet protocol (IP) addresses, timestamps, HTTP code, and page requests, among other information.

SUMMARY OF THE INVENTION

Various aspects and examples described herein provide network security systems and related methods. In one example, provided is a network security system that trains a deep learning architecture based on a Hypertext Transfer Protocol (HTTP) connectivity matrix that is extracted from one or more HTTP network logs. In particular, the network security system may provide training data based on the HTTP connectivity matrix such that the deep learning architecture may generate a general data representation of the HTTP network log. The network security system may then use the general data representation to detect one or more discordant network activities within the HTTP network log. Such examples may be used to protect a network, client, and/or host against malicious network activity and/or behavior.

According to an aspect, provided is a network security system. In one example, the network security system comprises a system interface to receive a Hypertext Transfer Protocol (HTTP) network log, the HTTP network log including a matrix of data arranged by at least one field and a time bin, a feature extraction component coupled to the system interface, the feature extraction component configured to extract a connectivity matrix from the HTTP network log based at least in part on a recurring behavioral pattern within the matrix of data, and a training module coupled to the feature extraction component, the training module being configured to provide deep learning architecture training data based on the connectivity matrix. The network security system may also comprise a deep learning architecture having one or more layers, the deep learning architecture configured to receive the deep learning architecture training data and propagate the deep learning architecture training data through the one or more layers to train the one or more layers, and the deep learning architecture being configured to receive the HTTP network log and generate a general data representation of the HTTP network log. A behavior analytics component may be coupled to the deep learning architecture and configured to detect a discordant network activity within the HTTP network log based on the general data representation of the HTTP network log.

According to various examples, the deep learning architecture is a stacked autoencoder, each layer of the one or more layers being a sparse autoencoder. In various examples, the behavior analytics component is configured to detect the discordant network activity in the HTTP network log by detecting a deviation from the recurring behavioral pattern. For example, the recurring behavioral pattern may be a reoccurring connection between a source Internet Protocol (IP) address and a destination IP address.

In various examples, the HTTP network log is a first HTTP network log for a single computer user, and the feature extraction component is configured to generate the connectivity matrix from the first HTTP network log based at least in part on a source Internet Protocol (IP) address of the single computer user, one or more destination IP addresses, and the time bin. In some examples, rows in the connectivity matrix indicate the source IP address of the single computer user and the time bin, and columns in the connectivity matrix indicate the one or more destination IP addresses. In various examples, a value within each cell of the connectivity matrix indicates a number of connections between at least the source IP address of the single computer user and an individual destination IP address of the one or more destination IP addresses. In some examples, the training module is further configured to interpolate values into zero-valued cells in the connectivity matrix.

According to various examples, the behavior analytics component is further configured to classify contents of the general data representation of the HTTP network log as human-initiated activity or machine-initiated activity, and the discordant activity within the HTTP network log is a first machine-initiated activity. In various examples, the HTTP network log is a HTTP network log for a plurality of computer users, and the behavior analytics component is further configured to group each of the plurality of computer users within one of a plurality of user classes based on the contents of the general data representation of the HTTP network log.

According to another aspect, provided is a method of monitoring network activity. In one example, the method comprises receiving a Hypertext Transfer Protocol (HTTP) network log, the HTTP network log including a matrix of data arranged by at least one field and a time bin, extracting a connectivity matrix from the HTTP network log based at least in part on a recurring behavioral pattern within the matrix of data, providing deep learning architecture training data to a deep learning architecture, the deep learning architecture training data being based on the connectivity matrix, receiving the deep learning architecture training data at the deep learning architecture, and propagating the deep learning architecture training data through one or more layers of the deep learning architecture to train the one or more layers, at the deep learning architecture, generating a general data representation of the HTTP network log, and detecting a discordant network activity within the HTTP network log based on the general data representation of the HTTP network log.

According to various examples, receiving the HTTP network log includes receiving a first HTTP network log for a single computer user, and extracting the connectivity matrix includes extracting the connectivity matrix from the first HTTP network log based at least in part on a source Internet Protocol (IP) address of the single computer user, one or more destination IP addresses, and the time bin. In various examples, rows in the connectivity matrix indicate the source IP address of the single computer user and the time bin, and columns in the connectivity matrix indicate the one or more destination IP addresses. In some examples, a value within each cell of the connectivity matrix indicates a number of connections between at least the source IP address of the single computer user and an individual destination IP address of the one or more destination IP addresses. In various examples, the method further comprises interpolating values into zero-valued cells in the connectivity matrix.

According to various examples, the method further comprises classifying contents of the general data representation of the HTTP network log as human-initiated activity or machine-initiated activity, and the discordant activity within the HTTP network log is a first machine-initiated activity. In various examples, receiving the HTTP network log includes receiving a HTTP network log for a plurality of computer users, and the method further comprises grouping each of the plurality of computer users within one of a plurality of user classes based on the contents of the general data representation of the HTTP network log. In various examples, the method further comprises grouping each of the plurality of computer users within one of a plurality of user classes based on the contents of the general data representation of the HTTP network log.

According to various examples, detecting the discordant internet activity in the HTTP network log includes detecting a deviation from the recurring behavioral pattern. In various examples, the recurring behavioral pattern is a reoccurring connection between a source Internet Protocol (IP) address and a destination IP address.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Various aspects and examples described herein provide network security systems and related methods. Certain examples are directed to a network security system that aggregates HTTP network log information and extracts a connectivity matrix based at least in part on a recurring behavioral pattern within the HTTP network log. Based on the connectivity matrix, the network security system provides training data to train a deep learning architecture (e.g., a stacked autoencoder). The trained deep learning architecture may then generate a general data representation of the HTTP network log information that can be used to detect one or more discordant network activities within the HTTP network log. In particular, examples of the network security systems and related methods described herein may be utilized to recognize patterns of user behavior, recognize patterns of machine behavior, and/or detect activities and/or behavior that is unusual and may be harmful to a computing system or network.

Protecting a network (e.g., LANs, WANS, extranets, intranets, cloud computing systems, and etc.) from malicious threats and behavior is of paramount interest in the realm of computer networks. Typical network security systems rely on blacklists (also known as block lists) and/or whitelists to control malicious network activity or behavior. Typically, a blacklist blocks network access for all items (e.g., URLs, IP addresses, domain names, etc.) listed in that blacklist. In contrast, a whitelist only permits network access for items listed in that whitelist. While blacklists are effective in controlling known malicious activity and behavior, zero-day threats and new forms of malicious activity often go undetected, or temporarily undetected. While whitelists resolve some of shortcomings of blacklists, whitelists can be over-inclusive and may block otherwise acceptable network activity.

Various aspects and implementations described herein address the shortcomings of blacklists, whitelists, and other known network security approaches. Particular examples of the described network security systems actively learn and predict malicious activity and behavior based on one or more learned patterns in HTTP network logs. In addition to providing improved accuracy and responsiveness when compared to other security approaches, various aspects of the network security systems and methods described herein may permit real-time adjustments and modifications of the network activity being monitored. Accordingly, the network security systems and methods described herein improve the functionality of prior network security systems while also offering functionality that is not currently available.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
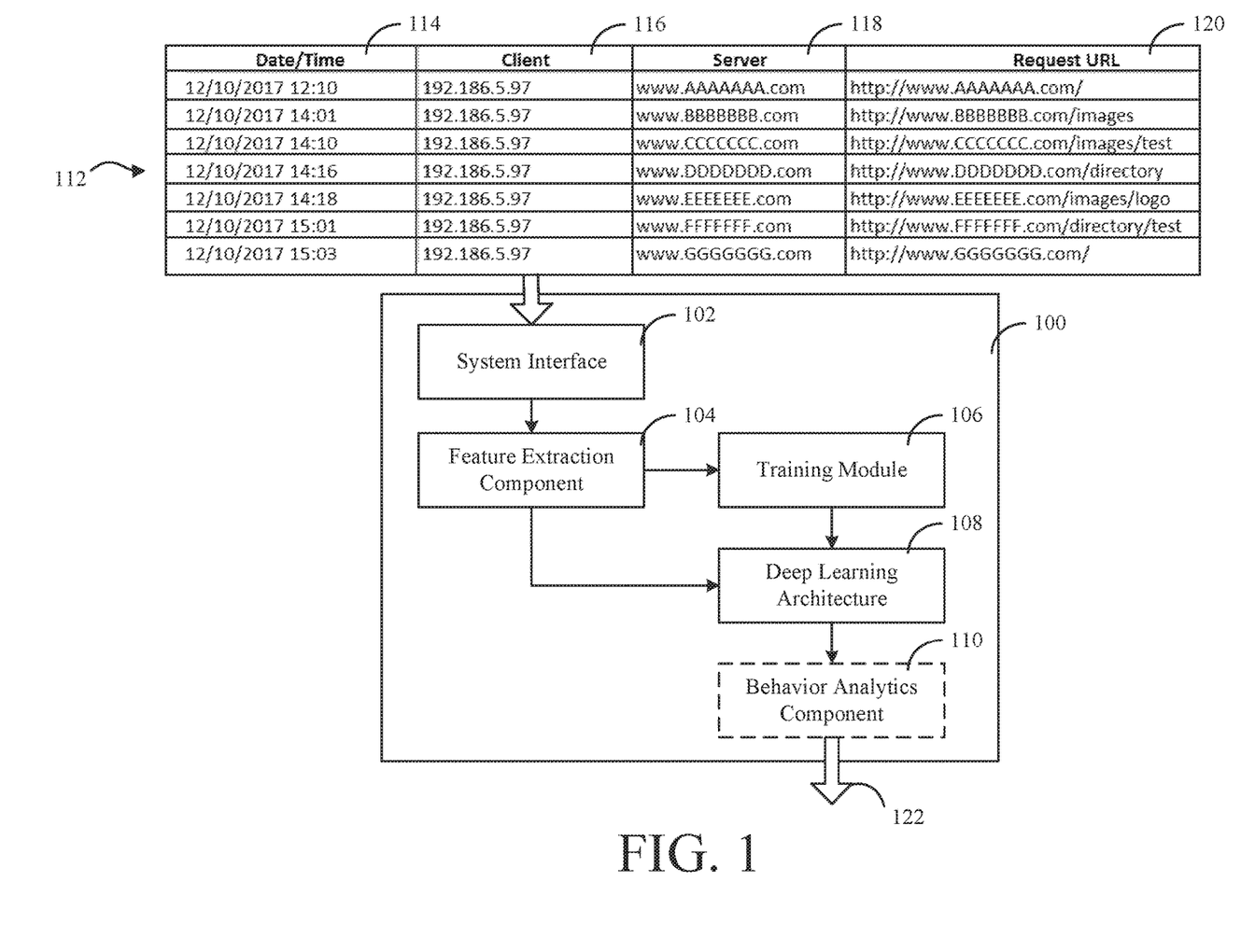
FIG. 1 is a block diagram of a network security system receiving a Hypertext Transfer Protocol (HTTP) network log, according to various examples described herein.

FIG. 1 illustrates a network security system 100 according to various examples described herein. As illustrated in FIG. 1, the network security system 100 may include a system interface 102, a feature extraction component 104, a training module 106, and a deep learning architecture 108, among other components. For example, in some instances, the network security system 100 may also include a behavior analytics component 110 (shown in ghost lines). Each of the system interface 102, the feature extraction component 104, the training module 106, the deep learning architecture 108, the behavior analytics component 110, and the other components of the network security system 100 may be a specialized hardware component. For instance, each component may be composed of an array of logic blocks. In particular, each component may implemented by an array of transistors arranged in an integrated circuit that provides a performance and power consumption similar to an ASIC (application-specific integrated circuit).

In some other examples, each of the system interface 102, the feature extraction component 104, the training module 106, the deep learning architecture 108, the behavior analytics component 110, and the other components of the network security system 100 may be a specialized software component executing within, or executed by, a computing system, such as the computing system 600 shown and further described below with reference to at least FIG. 6. In other examples, the system interface 102, the feature extraction component 104, the training module 106, the deep learning architecture 108, the behavior analytics component 110, and the other components of the network security system 100 may be a specialized hardware component or specialized software component, or combination thereof, provisioned between multiple computing systems in a distributed computer network.

Each of the system interface 102, the feature extraction component 104, the training module 106, the deep learning architecture 108, the behavior analytics component 110, and the other components of the network security system 100 may be may be coupled by an interconnection element, such as a bus, network, or other connection for exchanging data and/or instructions. The bus may include one or more physical busses and may include any communication coupling between system components including specialized or standard computing bus technologies. Thus, the bus enables communications (for example, data and instructions) to be exchanged between components of the network security system 100.

As illustrated in FIG. 1, the network security system 100 may receive a HTTP network log (represented generally by a matrix 112) at the system interface 102. The system interface 102 may include one or more input devices, one or more output devices, or a combination of input and output devices. That is, the system interface 102 allows the network security system 100 to exchange information and communicate with users and other systems. The system interface 102 may exchange data via a network connection using one or more of a variety of methods, protocols, and standards. For instance, the network connection may be a LAN, WAN, extranet, intranet, or cloud computing system, to name a few examples. As discussed, HTTP network logs may include a matrix of data that corresponds to one or more requests received by a host (e.g., and sent by a client) and/or data that corresponds to one more responses received by a client (e.g., and provided by a host).

In some particular examples, the HTTP network log received by the system interface 102 may include a matrix of data that is arranged by one or more fields and a time bin. For instance, FIG. 1 shows the matrix 112 representing the received HTTP network log as including data arranged in rows and columns. Each row may represent a particular request, and each column may represent a particular field. Accordingly, in FIG. 1, each row is shown as having a different time bin (e.g., date and time). In the illustrated matrix, the columns are representative of the time stamp (e.g., date and time; e.g., column 114), a source Internet Protocol (IP) address (e.g., client IP address; e.g., column 116), a destination IP address (e.g., server address; e.g., column 118), and a URL address requested by the client (e.g., column 120).

While FIG. 1 illustrates one example of a HTTP network log, in various other examples, the system interface 102 may receive a HTTP network log having different fields of data. That is, the columns illustrated and described with reference to HTTP network log of FIG. 1 are merely provided for the purpose of explanation, and in other examples, other rows, columns, and formats may be used. For instance, in one example, the HTTP network log may have a column for destination IP categories (e.g., sorted by Uniform Resource Indicator (URI)). In other examples, HTTP network logs may include data size, ports, additional IP addresses, and messages, among a variety of other information. Moreover, while a single HTTP network log is described herein for the purpose of explanation, in practice, the security network system 100 may receive a multitude of HTTP network logs. For instance, over one hundred HTTP network logs may correspond to a single website search performed by a user's personal computer. Accordingly, the system interface 102 may continuously or discretely receive more than one HTTP network log, and in many instances, may receive a large volume of HTTP network logs.

In some examples, the format of the HTTP network log may be based on the particular network activity that is being monitored by the network security system, as further described below. Moreover, while FIG. 1 illustrates the system interface 102 as receiving the HTTP network log from an external system, in other examples, the network security system 100 may have one or more specialized hardware or software components that track client requests and/or host responses to dynamically generate the HTTP network log. In such an example, the system interface 102 may serve as an interface between the HTTP network log generating component and the feature extraction component 104. The system interface 102 may also be coupled to a storage element (e.g., a volatile storage or a non-volatile storage) and retrieve the HTTP network log from the storage element.

The feature extraction component 104 is coupled to the system interface 102 and is configured to extract a connectivity matrix from the HTTP network log. In many cases, the HTTP network log may include a large data set with no "ground truth" (i.e., verified starting information) regarding malicious network activity and/or behavior. That is, as a result of the size and disparate nature of the data within the HTTP network log, the HTTP network log merely offers inferences of malicious network activity and/or behavior, as opposed to direct empirical evidence. Accordingly, the feature extraction component 104 may extract a connectivity matrix from the HTTP network log based at least in part on a recurring behavioral pattern within the matrix of data. In many instances, the recurring behavioral pattern may be a reoccurrence of a particular item within the HTTP network log. In other examples, the recurring behavioral pattern is a correlation between one or more entries within the HTTP network log. For instance, the recurring behavioral pattern may be a reoccurring connection between a source Internet Protocol (IP) address and a destination IP address.

The connectivity matrix may then be used to generate deep learning architecture training data to train a deep learning architecture 108. For instance, referring to FIG. 1, the feature extraction component 104 may be configured to generate the connectivity matrix from the illustrated HTTP network log based at least in part on the source Internet Protocol (IP) address, a destination IP address (e.g., server address), and the time bin. In some other examples, the feature extraction component 104 may be configured to extract the connectivity matrix from the HTTP network log based on one or more destination IP categories. Destination IP categories may refer to a categorization of a destination IP address, which may be categorized based on source, content, frequency of access, and/or threat level, to name a few examples.

In at least one example, the connectivity matrix is a data representation that connects otherwise disparate data within the HTTP network log. In particular, relative to the HTTP network log, the connectivity matrix may be targeted to a particular field or data sub-set within the HTTP network log, and therefore contain a relatively smaller and concentrated amount of data relative to the entire HTTP network log. For instance, in one example, the connectivity matrix may include a plurality of rows and columns in which the rows are indicative of one data sub-set from the HTTP network log, and the columns are representative of another data sub-set from the HTTP network log. Cells within the connectivity matrix may include a value representative of the connection or connections between the data sub-set of a particular row and the data sub-set of a particular column.

Figure 2:
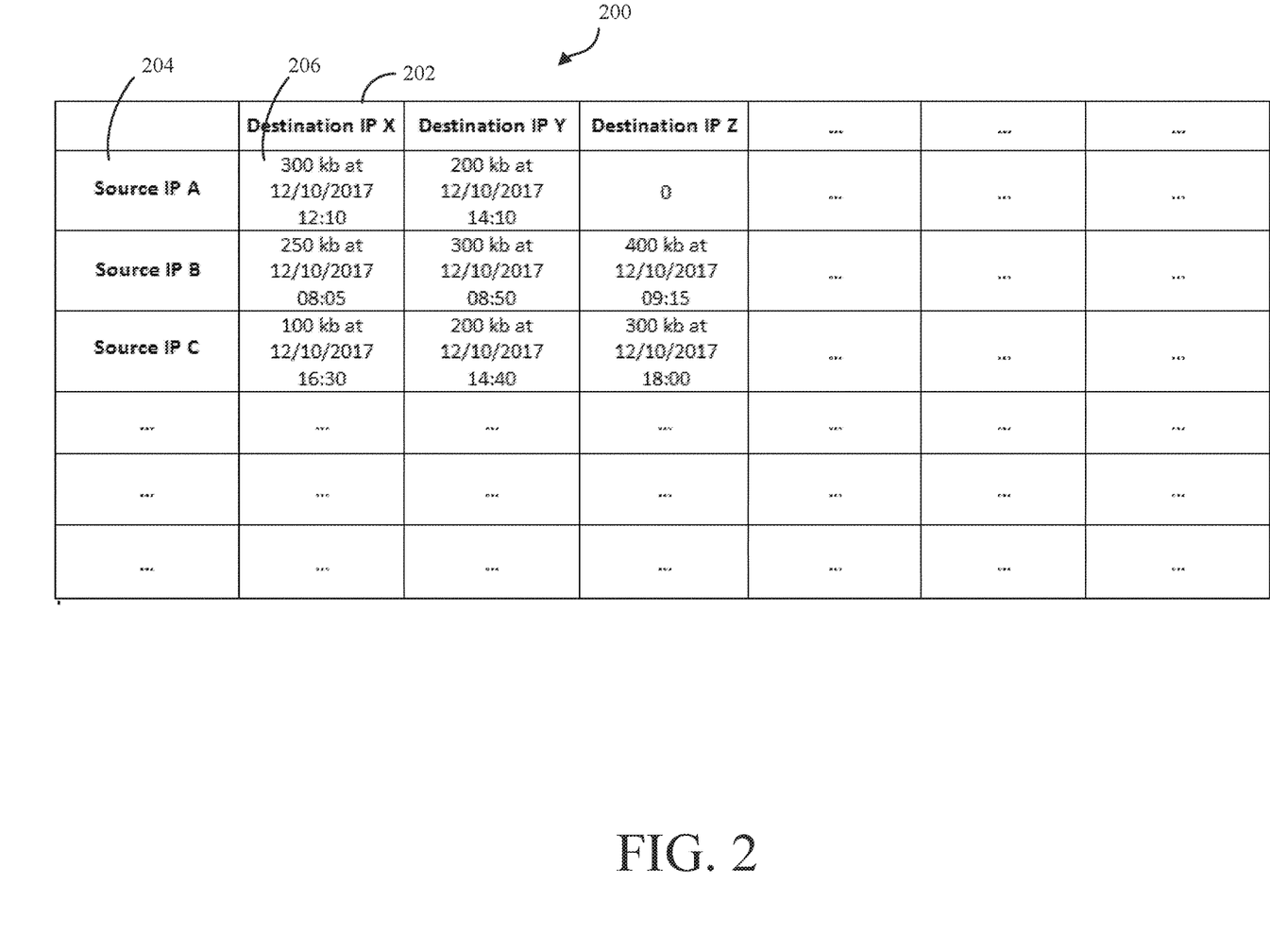
FIG. 2 is a visualization of a connectivity matrix, according to various examples described herein.

For purposes of explanation, rows within the connectivity matrix may be representative of the source IP address of a single computer user and the time bin corresponding to a request, and the columns may be representative of destination IP addresses. In such an example, a value within each cell of the connectivity matrix indicates the amount of connections between the source IP address of the single computer user, and an individual one of the destination IP addresses. In some instances, the connectivity matrix may be sparse. That is, the connectivity matrix may include multiple cells where no connection exists. In these cells, a zero value may represent the absence of a connection. In these instances, one or more components of the network security system 100 may interpolate values into the zero-valued cells. In one example, these operations may be performed by the training module 106. FIG. 2 illustrates one example visualization of a connectivity matrix 200.

In FIG. 2, the connectivity matrix 200 is a data representation that shows the network traffic between a set of source IP values (e.g., addresses) and a set of destination IP values (e.g., addresses). In FIG. 2, the rows 204 are representative of the source IP values (e.g., Source IP A, Source IP B, Source IP C, etc.), and the columns 202 are representative of the destination IP values (e.g., Destination IP X, Destination IP Y, Destination Z, etc.). As further shown in FIG. 2, each particular cell 206 within the connectivity matrix 200 is descriptive of the connection between a source IP value and a destination IP value. In particular, each cell 206 is shown as being descriptive of the total bytes of data exchanged between the corresponding source IP value and the corresponding destination IP value at a particular time bin. For instance, the cell 206 corresponding to Source IP A and Destination IP X includes 300 kb at Dec. 10, 2017 12:10. It is appreciated that FIG. 2 merely offers one example of a connectivity matrix for the purpose of explanation, and in the other examples described herein, a connectivity matrix may include additional or other information that than explicitly illustrated in FIG. 2.

Figure 3:
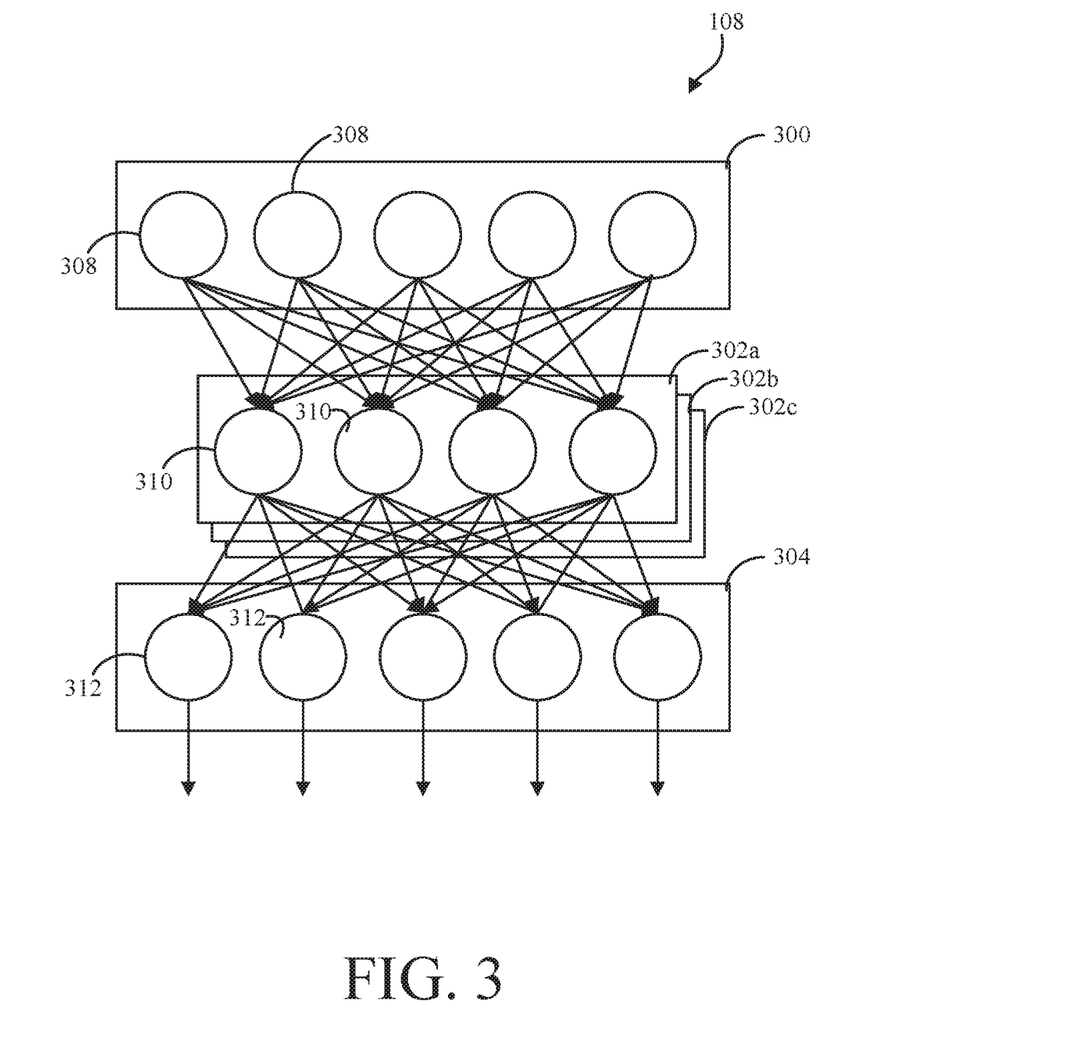
FIG. 3 is a block diagram of a deep learning architecture, according to various examples described herein.

Returning to FIG. 1, the feature extraction component 104 may be coupled to the training module 106, and may provide the connectivity matrix to the training module 106. The training module 106 is configured to provide deep learning architecture training data (also referred to herein generally as "training data") to the deep learning architecture 108 based on the connectivity matrix. As also shown in FIG. 1, the network security system 100 may include a deep learning architecture 108 to receive the training data and the HTTP network log. The deep learning architecture 108 may have one or more layers, and may propagate the training data through the one or more layers to train the one or more layers. Based on the continued learning of the deep learning architecture 108, and the received HTTP network log, the deep learning architecture 108 may generate a general data representation of the HTTP network log. As further described with reference to the behavior analytics component 110, the general data representation may be used to detect a discordant network activity within the HTTP network log. In many cases, the discordant network activity corresponds to, or is indicative of, malicious network activity or behavior Referring to FIG. 3, illustrated is a block diagram of one particular example of the deep learning architecture 108. In various examples, the deep learning architecture 108 implements a deep learning method to learn a data representation of the HTTP network log, and generate a general data representation. As discussed herein, the general data representation is a reduction and extraction of data from the HTTP network log that is suitable for recognizing patterns of network activity or behavior. That is, the general data representation is a low-dimensional and dense representation of HTTP network log data that is dimensionally reduced when compared with the HTTP network log.

As shown in FIG. 3, the deep learning architecture 108 may be a neural network including one or more cascaded layers of "neurons". Each neuron is a computational unit that receives an input and generates an output based at least in part on an activation function for that neuron. In one example, and as illustrated, the deep learning architecture 108 may be a stacked autoencoder. Each layer of the stacked autoencoder may be a sparse autoencoder. In the illustrated example, the deep learning architecture 108 has an input layer 300, an output layer 304, and one or more intermediate layers (e.g., "hidden" layers) 302a-c (generally referred to as "intermediate layers 302"). Intermediate layers 302 are interposed between the input layer 300 and the output layer 304. Each layer of the deep learning architecture 108 uses output(s) from the immediately preceding layer as input(s). In FIG. 3, the deep learning architecture 108 has five input units 308, four intermediate units 310, and five output units 312. However, it is appreciated that in various other examples other arrangements may be used. In many instances, the training data is the input(s) at the input layer of the deep learning architecture 108.

As shown in FIG. 3, for each input of training data, the deep learning architecture 108 may propagate the training data through the one or more layers to train the one or more layers. That is, the training data may be propagated from the input layer 300, through the intermediate layers 302, to obtain an output at the output layer 304. A deviation between the input and the output may then be back-propagated through the one or more layers to update and train the one or more layers.

Returning to FIG. 1, and with continuing reference to FIG. 3, as previously described, in various examples the deep learning architecture 108 receives the training data derived from the connectivity matrix as input(s) at the input layer 300. That is, in various examples, the input layer 300 of the deep learning architecture 108 may receive a matrix including an array of cells that each has a value representative of the connection or connections between the data sub-set of a particular row and the data sub-set of a particular column of the connectivity matrix. As further illustrated in FIG. 1, the deep learning architecture 108 may also receive the HTTP network log and generate a general data representation. In various examples, the deep learning architecture 108 groups the encoded data of the general data representation into clusters. In one example, the clusters may be based on time of day, such as morning, noon, evening, and night-time. In other examples, the clusters may be based on other aspects of network activity having similar characteristics.

As discussed, the deep learning architecture 108 may be a stacked autoencoder. In particular examples, the stacked autoencoder may perform the dimensionality reduction of the HTTP network log. In one example, the intermediate layers of the deep learning architecture 108, such as those illustrated in FIG. 3, include a plurality of encode layers that provide a successively lower-dimensional output relative to the dimensionality of the HTTP network log. In such an example, the deep learning architecture 108 includes a plurality of decode layers that provide a successively higher-dimensional output relative to the dimensionality of the encode layer output. The output of deep learning architecture 108 is evaluated against the input to train the deep learning architecture 108. That is, the decode layers are trained to reconstruct the received input (the HTTP network log in this example), and the encode layers are trained to learn a low-dimensional data representation and allows an accurate reconstruction of the input. As discussed, the trained encode layers may be used for preprocessing for other learning tasks. For example, entries within a connectivity matrix may be used to train the stacked autoencoder, which when trained, could encode a vector of byte counts for various destination IP addresses into a relatively smaller, dense vector.

In various examples, the behavior analytics component 110 is coupled to the deep learning architecture 108 to receive the general data representation. The behavior analytics component 110 is configured to detect a discordant network activity within the HTTP network log based on the general data representation of the HTTP network log. As discussed herein, in various examples, the discordant network activity is one or more network activities that are a deviation from a recurring behavioral pattern in the HTTP network log. In some cases, the deviation is a malicious network activity or behavior, or is indicative of a malicious network activity or behavior. The malicious network activity may be unauthorized network access, unauthorized data access, and/or exfiltration, among other malicious network activity or behavior.

For instance, if the recurring behavioral pattern is a reoccurring connection between a source Internet Protocol (IP) address and a destination IP address, the discordant network activity may be a new connection between the same or another source Internet Protocol (IP) address and a different destination IP address. In another example, if the recurring behavioral pattern is a reoccurring connection between a source IP address and a destination IP address during a particular time of day (e.g., morning), the discordant network activity may be a connection between the source IP address and the destination IP address during a different time of day (e.g., night-time). In another example, if the recurring behavioral pattern is recurring network activity at a particular time of day, the discordant network activity may be network activity at a different time of day. In still other examples, the discordant network activity may be based on the amount of data or information transferred. For instance, the discordant network activity may be a large data exchange compared to a typical behavior of relatively smaller data exchanges.

As malicious network activity or behavior becomes more circumspect, detection may require greater focus. For instance, a small series of unauthorized data exchanges each with a different destination IP address over a long period of time may be more challenging to detect than overt discordant network activity. For more discreet malicious network activity and behavior, the deep learning architecture 108 may be continuously trained and adjusted over time. For instance, the deep learning architecture 108 may be used to provide a model trained from network connectivity data and historically unused IP destination addresses over a specified time scale. In some examples, the behavior analytics component 110 may provide the detected discordant activity (and related encoded data) for interaction, such as for interaction with users and other systems (shown generally as output 122). While in one example, visual and/or auditory alerts may be generated, in other examples, the raw encoded data may be presented for interaction (e.g., via one or more graphical user interfaces).

The behavior analytics component 110 may be further configured to classify and/or group contents of the general data representation of the HTTP network log. In some examples, this may include identifying and classifying the one or more clusters within the general data representation. Classifications may then be used to detect discordant network activities within a subsequent HTTP network log. For example, the behavior analytics component 110 may be configured to classify contents of the general data representation as human-initiated activity or machine-initiated activity. Human-initiated activity corresponds to network activity that results from a computer user's interactions with the computer. In contrast, machine-initiated activity corresponds to autonomous network activity performed by the computer itself, a software component executing on the computer, or one or more computing systems that communicate with the computer. In such an example, the recurring behavioral pattern may correspond to human-initiated activity and the discordant activity detected by the behavior analytics component may be a machine-initiated activity.

In certain examples, the HTTP network log is a HTTP network log for a plurality of computer users, and the behavior analytics component 110 is configured to group each of the plurality of computer users within one or more of a plurality of user classes based on the contents of the general data representation. For instance, the behavior analytics component may analyze one or more clusters in the general data representation and classify a user according to that user's network privileges. For example, users may be assigned to one or more user classes, such as employee, manager, or administrator. In such an example, the behavior analytics component 110 may be configured to detect a discordant activity based on a detected network activity that is discordant from the permitted network activity associated with a user class. That is, if a user is classified as an employee, but is performing network activity reserved for an administrator, the behavior analytics component 110 may identify that network activity as a discordant activity. For example, this activity may include downloading and installing software, altering network configurations (e.g., active directories or network ports), or attempting to access secured devices or drives.

As discussed above, in certain examples, the feature extraction component 104 may be controlled to dynamically adjust the feature extraction and parameterization features of the connectivity matrix. That is, the feature extraction component 104 may dynamically adjust the connectivity matrix to represent different aspects of the HTTP network logs. Adjustment of the data sub-sets represented within connectivity matrix will generate a new connectivity matrix, which results in new training data for the deep learning architecture 108. Based on the new training data, the deep learning architecture 108 generates an evolving general data representation of the HTTP network log. Based on the evolving general data representation, the behavior analytics component 108 may provide user-level behavior analytics. In particular, the user-level behavior analytics may continuously evolve to accurately represent changing network activity. In various examples, the network security system 100 may receive one or more user commands to adjust the connectivity matrix (e.g., extract and/or adjust fields). However, in other examples, such adjustments may be made automatically by the network security system 100 itself. Adjustments may also be made to the connectivity matrix to train the deep learning architecture 108 to target particular network activity, such as discrete malicious activity. Such adjustments may include tailoring the rows and/or columns of the connectivity matrix to include historically unused destination IP addresses, to name one example.

Figure 4:
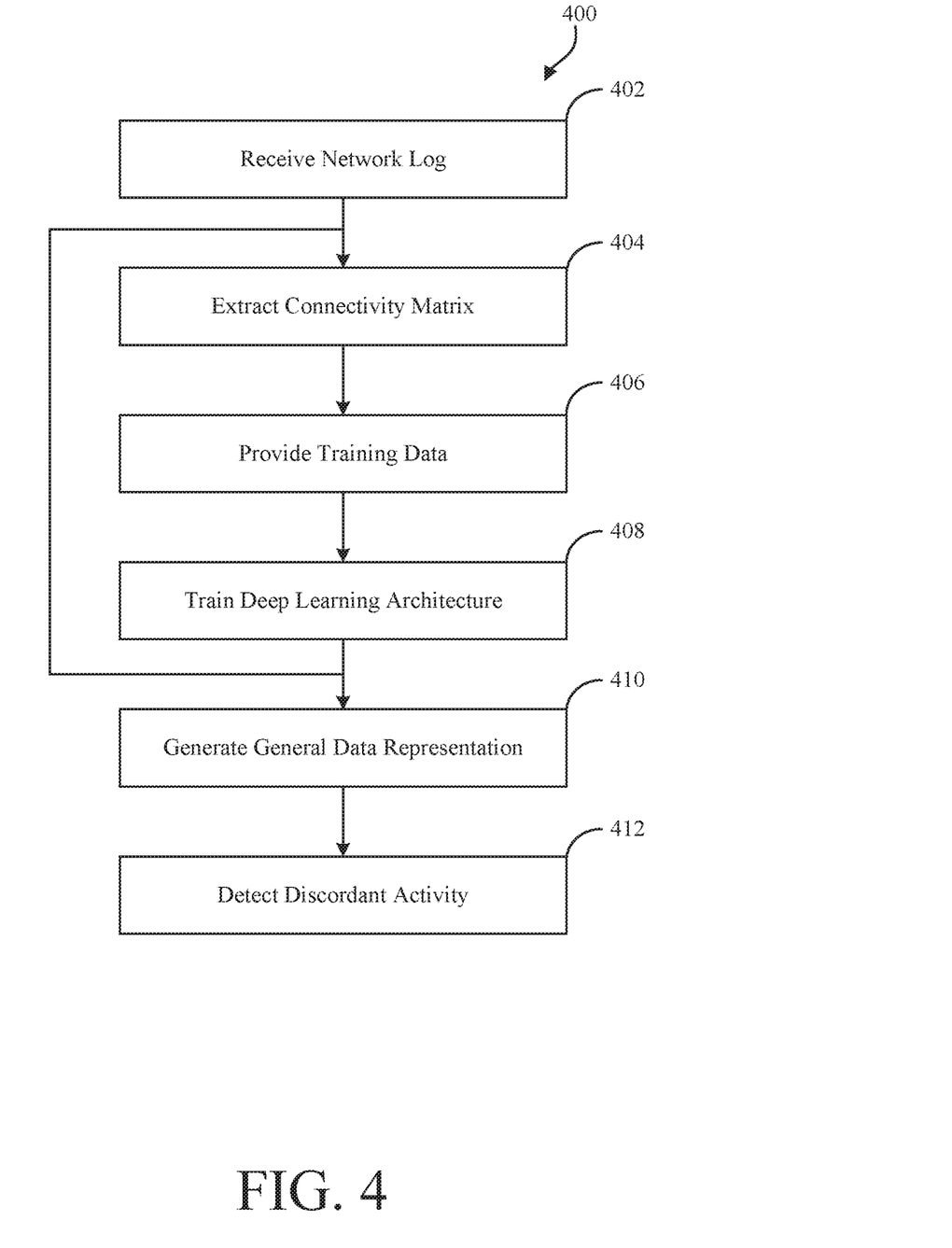
FIG. 4 is a process flow for monitoring network activity, according to various examples described herein.

As discussed above with reference to at least FIGS. 1-3, various examples perform processes to monitor network activity. These processes may be performed by a network security system, or one or more components of a network security system, such as the network security system 100 illustrated in FIG. 1. One example of a process according to various aspects described herein is illustrated in FIG. 4. FIG. 4 is described with continuing reference to at least FIGS. 1, 2, and 3. As illustrated in FIG. 4, the process 400 may include acts of receiving a network log (e.g., a HTTP network log), extracting a connectivity matrix, providing training data to a deep learning architecture, training the deep learning architecture, generating a general data representation of the HTTP network log, and detecting a discordant activity (e.g., malicious network activity) within, or evidenced by, the HTTP network log.

In act 402, the process 400 includes receiving a HTTP network log. For instance, the HTTP network log may be received at the system interface 102 of the network security system 100 illustrated in FIG. 1. As previously discussed, the HTTP network log includes a matrix of data arranged by one or more fields and a time bin. In act 404, the process 400 includes extracting a connectivity matrix from the HTTP network log based at least in part on a recurring behavioral pattern within the matrix of data. In many examples, the particular features and/or parameters extracted from the HTTP network log to form the connectivity matrix are selected by a user of the network security system 100. However, in some examples, the features and/or parameters may be dynamically selected by the network security system 100 itself. The connectivity matrix may then be used to generate deep learning architecture training data to train the deep learning architecture 108.

In act 406, the process 400 includes providing training data to the deep learning architecture 108. As discussed, the training data is based on the particular connectivity matrix extracted by the feature extraction component 104. In various examples, the training module 106 of the network security system 100 provides the training data. As described with reference to at least FIG. 1, the network security system 100 may include a deep learning architecture 108 to receive the training data and the HTTP network log. In various examples, the deep learning architecture 108 may have one or more layers. In act 408, the process 400 includes receiving the deep learning architecture training data at the deep learning architecture 108, and propagating the deep learning architecture training data through the one or more layers of the deep learning architecture 108 to train the one or more layers. Based on the continued learning of the deep learning architecture 108, and the received HTTP network log, the process 400 may include generating a general data representation of the HTTP network log (act 410).

In act 412, the process 400 includes detecting a discordant network activity within the HTTP network log based on the general data representation of the HTTP network log. As discussed herein, the general data representation is a reduction and extraction of data from the HTTP network log that is suitable for recognizing patterns of network activity and behavior. That is, the general data representation is a low-dimensional and dense representation of HTTP network log data that is dimensionally reduced when compared with the HTTP network log. In many examples, the discordant network activity is malicious network activity or behavior, or, network activity that is indicative of malicious activity or behavior.

Figure 5A:
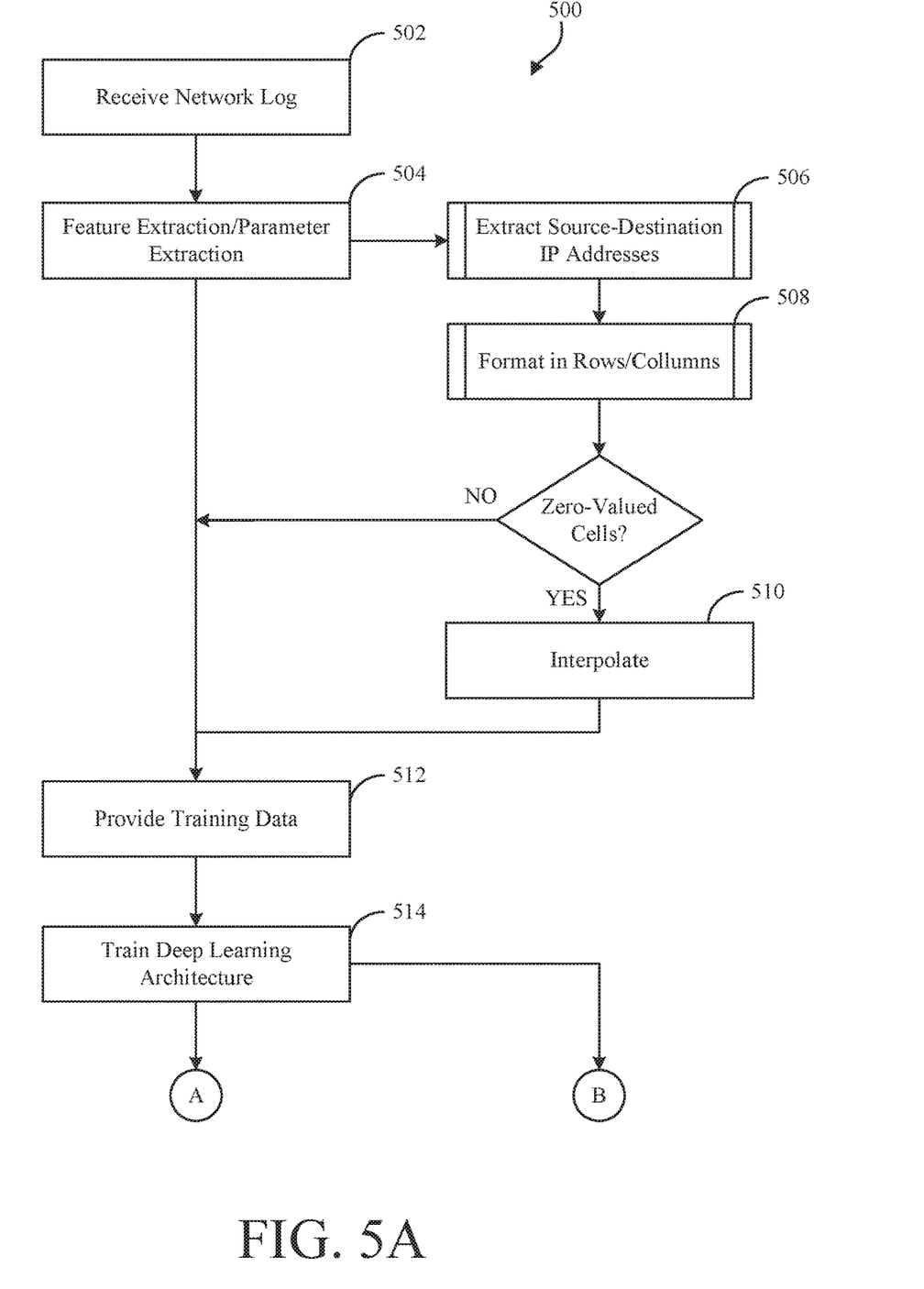
FIG. 5A-5B is a more detailed process flow for monitoring network activity, according to various examples described herein.
Figure 5B:
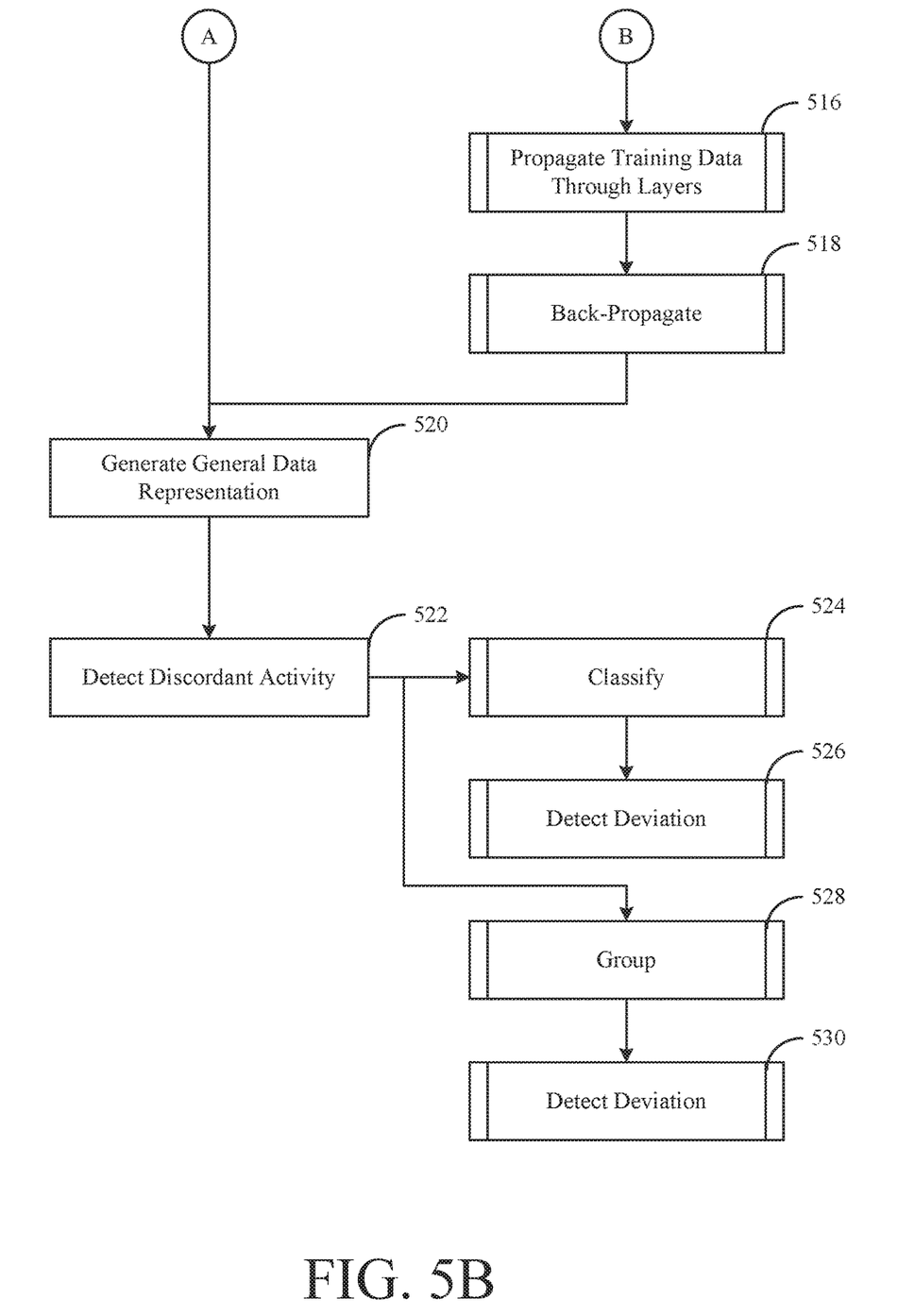

FIG. 5A-5B illustrates a more detailed process flow of a process for monitoring network activity. Accordingly, FIG. 5A-5B includes many acts that are similar to the acts that were previously described with reference to FIG. 4. The acts of FIG. 5A-5B may be performed by a network security system, or one or more components of a network security system, such as the network security system 100 illustrated in FIG. 1. Accordingly, FIG. 5A-5B is described with continuing reference to the network security system 100 of FIG. 1.

In act 502, similar to act 402 of FIG. 4, the process 500 may include receiving a HTTP network log. While in one example, the HTTP network log may be received at the system interface 102 of the network security system 100 via an external network connection, in some examples, the HTTP network log may be received from a data storage element or another component of the network security system 100. For instance, the HTTP network log may be received from one or more specialized hardware or software components that generate the HTTP network log. While the system interface 102 is described as receiving a single HTTP network log, in other examples, multiple HTTP network logs may be received by the system interface 102 in act 502. The multiple network logs may be received sequentially or concurrently.

In act 504, the process 500 may include extracting a connectivity matrix from the HTTP network log based at least in part on a recurring behavioral pattern within the matrix of data of the HTTP network log. As previously discussed with reference to at least FIG. 1, the connectivity matrix, relative to the HTTP network log, may be targeted to a particular field or data sub-set within the HTTP network log. Accordingly, the connectivity matrix may contain a comparatively smaller and concentrated amount of information relative to the HTTP network log. Accordingly, act 504 may include sub-acts 506 and 508 illustrated in FIG. 5. In sub-act 506 the process 500 may include extracting one or more features or parameters from the HTTP network log. For instance, act 506 is shown as including the act of extracting the one or more source Internet Protocol (IP) addresses and one or more destination IP addresses from the HTTP network log.

As previously discussed, the connectivity matrix may include a plurality of rows and columns in which the rows are indicative of one data sub-set from the HTTP network log, and the columns are representative of another data sub-set from the HTTP network log. Cells within the connectivity matrix may include a value representative of the connection or connections between the field of a particular row and the field of a particular column. As such, in sub-act 508, the process 500 may include formatting the extracted parameters and/or features in one or more rows and columns to provide the connectivity matrix.

In some instances, the connectivity matrix may be sparse. That is, the connectivity matrix may include multiple cells where no connections exist. If one or more zero-valued cells are present within the connectivity matrix, the process 500 may include interpolating values into those zero-valued cells in the connectivity matrix (act 510). In one example, these operations may be performed by the training module 106. For example, in some situations, the training module 106 may interpolate a default value into zero-valued cells. This may be the case when there is no network traffic and no connection was observed. In these situations, a zero may be the default value.

However, in other situations, an incomplete connectivity matrix may result from an incomplete HTTP network log. For instance, technical issues may result in a time interval for which no information is recorded in a received HTTP network log. In these situations, the absence of information in the HTTP network log does not necessarily correlate with an absence of network activity. Accordingly, in various examples, the training module 106 may use linear interpolation to "fill-in" the sparse connectivity matrix based at least on similar HTTP network logs. For instance, for a given source IP address over a missing time period, the training module 106 may find a vector of historical destination IP connections for that source IP address at that missing time of day in a past HTTP network log. The training module 106 may, similarly, find a vector of future destination IP connections for that source IP address at that missing time of day in a future HTTP network log, and use an average (weighted by distance in time) of those vectors as a proxy for the missing information.

In act 512, the process 500 may include providing deep learning architecture training data based on the connectivity matrix. Specifically, training data may be used to train a deep learning architecture, such as the deep learning architecture 108 illustrated in FIG. 1 and FIG. 3 (act 514). As shown in FIG. 5, act 514 may include sub-act 516, and in some examples, sub-act 518. In sub-act 516, the process 500 includes propagating the training data through the one or more layers of the deep learning architecture 108 to train the one or more layers. For instance, this may include propagating the training data as one or more inputs from the input layer 300, through the one or more intermediate layers (e.g., "hidden" layers) 302, to obtain an output at an output layer 304. In sub-act 518, the process 500 may include back-propagating a deviation between the output of the output layer 304, and the input (e.g., the training data), through the one or more layers to update and train the one or more layers.

In various examples, the process 500 may include receiving the HTTP network log at the deep learning architecture 108, and generating a general data representation of the HTTP network log (act 520). As discussed herein, the general data representation is a reduction and extraction of data from the HTTP network log that is suitable for recognizing patterns of network activity and behavior. That is, the general data representation is a low-dimensional and dense representation of HTTP network log data that is dimensionally reduced when compared with the HTTP network log. In some examples, act 520 may include generating a general data representation in which the corresponding encoded data is grouped into one or more clusters.

In act 522, the process 500 may include detecting a discordant network activity within the HTTP network log based on the general data representation of the HTTP network log. In many cases, act 522 includes detecting malicious network activity or behavior, or detecting activity indicative of (e.g., associated with) malicious activity or behavior. In some examples, act 522 includes sub-acts 524 and 526. In other examples, act 522 includes sub-acts 528 and 530.

In sub-act 524, the process 500 may include classifying the contents of the general data representation (e.g., the encoded data). In particular, sub-act 524 may include classifying the one or more clusters of the general data representation. For instance, sub-act 524 may include classifying the contents of the general data representation based on the source that initiated the activity, for instance, as human-initiated activity or as machine-initiated activity. Based on the classified contents of the general data representation, the process 500 may include detecting the discordant activity within the HTTP network log based on an unexpected deviation in classification at a particular time bin (act 526).

In certain examples, the HTTP network log is a HTTP network log for a plurality of computer users, and the process 500 may include grouping each of the plurality of computer users within one of a plurality of user classes based on the contents of the general data representation (act 528). For instance, the process 500 may include analyzing one or more clusters in the general data representation and classifying a user according to that user's network privileges. For example, users may be assigned to one or more user classes, such as employee, manager, and administrator. In such an example, detecting the discordant network activity may include detecting a discordant activity based on detected network activity that is inconsistent the permitted network activity associated with a user class (act 530). While not explicitly illustrated or described with reference to FIG. 5, in various other examples, the process 500 may include other acts and/or sub-acts. Such acts and/or sub-acts are described herein with reference to at least the network security system 100 illustrated in FIG. 1.

As discussed above with reference to FIG. 1, in some examples, one or more components of the network security system 100 may be implemented as a software component executing on a specialized computing system, or provisioned as one or more instances among a plurality of specialized computing systems. FIG. 6 shows a block diagram of one example of a specialized computing system 600, in which various aspects and functions in accord with the present systems and methods may be practiced. That is, FIG. 6 illustrates a computing system 600 that can be specially configured to perform the functions, operations, and/or processes disclosed herein (e.g., functions of the system interface 102, feature extraction component 104, training module 106, deep learning architecture 108, and/or behavior analytics component 110 shown in FIG. 1).

The computing system 600 may be interconnected and may communicate with one or more additional computing systems 602, 604, and may exchange data through a communication network 616. The network 616 may include any communication network through which computer systems may exchange data. To exchange data via the network 616, the computing systems 600, 602, 604 and the network 616 may use various methods, protocols, and standards including, among others, HTTP.

Figure 6:
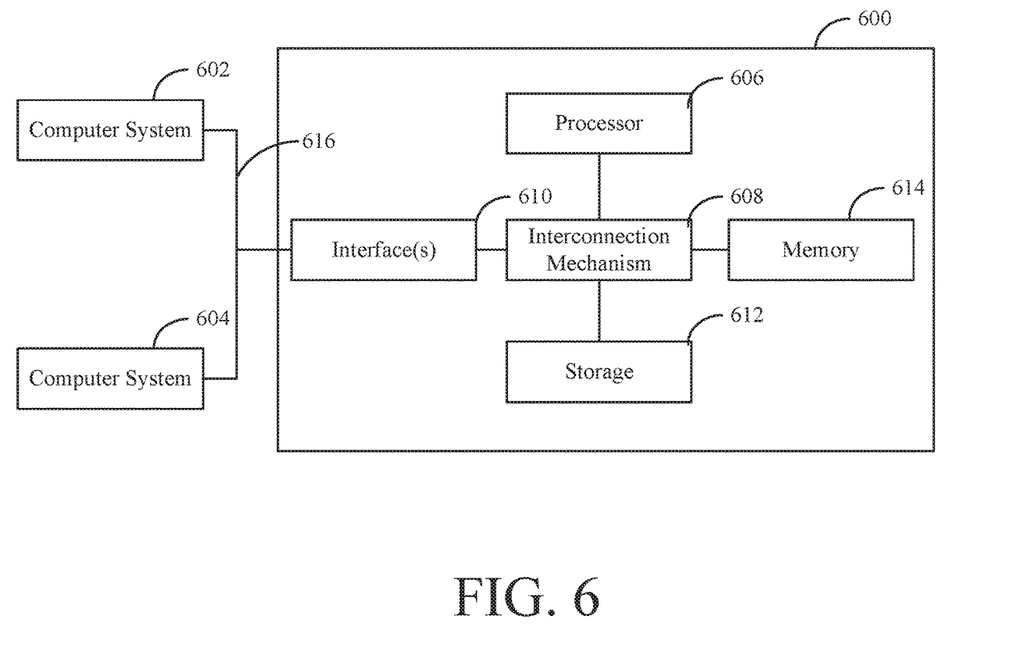
FIG. 6 is a block diagram of a computing system, according to various examples described herein.

Various aspects and functions in accord with the discussed network security system may be implemented as specialized hardware or software executing in one or more computer systems including the computing system 600 shown in FIG. 6. As depicted, the computing system 600 includes a processor 606, a memory 614, a bus 608, one or more interfaces 610, and a storage system 612. The processor 606, which may include one or more microprocessors or other types of controllers, can perform a series of instructions that manipulate data. The processor 606 may be, for example, a commercially available processor or controller. As shown, the processor 606 is connected to other system components, including the memory 614, by the bus 608.

The memory 614 may be used for storing programs and data during operation of the computing system 600. For example, the memory 614 may store one or more HTTP network logs, a connectivity matrix, and/or one or more general data representations. Thus, the memory 614 may be a relatively high performance, volatile, random access memory such as a dynamic random access memory (DRAM) or static memory (SRAM). However, the memory 614 may include any device for storing data, such as a disk drive or other non-volatile storage device, such as flash memory or phase-change memory (PCM).

Components of the computing system 600 may be coupled by an interconnection element such as the bus 608. The bus 608 may include one or more physical busses (for example, busses between components that are integrated within a same machine), and may include any communication coupling between system placements including specialized or standard computing bus technologies. Thus, the bus 608 enables communications (for example, data and instructions) to be exchanged between system components of the computing system 600.

Computing system 600 also includes one or more interfaces 610 such as input devices, output devices, or combination input/output devices. The interface devices 610 may receive input, provide output, or both. For example, output devices may render information for external presentation. Input devices may accept information from external sources. The interface devices 610 allow the computing system 600 to exchange information and communicate with external entities, such as users and other systems. In some examples, the computing system 600 may exchange HTTP network log information via the interface 610, as discussed above.

Storage system 612 may include a computer-readable and computer-writeable non-volatile storage medium in which instructions are stored that define a program to be executed by the processor. The instructions may be persistently stored as encoded signals, and the instructions may cause the processor 606 to perform any of the functions described herein. A medium that can be used with various examples may include, for example, an optical disk, a magnetic disk, or a flash memory, among others. In operation, the processor 606 or some other controller may cause data to be read from the non-volatile recording medium into another memory, such as the memory 614, that allows for faster access to the information by the processor 606 than does the storage medium included of the storage system 612. The memory may be located in the storage system 612 or in the memory 614. The processor 606 may manipulate the data within the memory 614, and then copy the data to the medium associated with the storage system 612 after processing is completed.

Various aspects and functions in accord with the present invention may also be practiced on one or more computers having different architectures or components than that shown in FIG. 6. For instance, the computing system 600 may include specially-programmed, special-purpose hardware, such as for example, an application-specific integrated circuit (ASIC) tailored to perform a particular operation disclosed herein.

Accordingly, as described herein, various aspects and examples provide a network security system that trains a deep learning architecture based on a HTTP connectivity matrix extracted from one or more HTTP network logs. One or more components of the network security system may provide training data based on the HTTP connectivity matrix such that the deep learning architecture may generate a general data representation of the HTTP network log. The general data representation may be used to detect one or more discordant network activities within the HTTP log. Such examples may be used to protect a network, client, and/or host against malicious activity and/or behavior. In contrast to typical network security systems that rely on blacklists or whitelists to monitor network activity, various aspects and implementations described herein actively adapt to learn and predict malicious activity and behavior.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A network security system comprising:
    a system interface to receive a Hypertext Transfer Protocol (HTTP) network log for a single user, the HTTP network log including a matrix of data arranged by at least one field and a time bin; and
    a processor configured to execute:
        a feature extraction component coupled to the system interface, the feature extraction component configured to extract a connectivity matrix from the HTTP network log based at least in part on a recurring behavioral pattern within the matrix of data, a source Internet Protocol (IP) address of the single computer user, one or more destination IP addresses, and the time bin, wherein a value within each cell of the connectivity matrix indicates a number of connections between at least the source IP address of the single computer user and an individual destination IP address of the one or more destination IP addresses;

a training module coupled to the feature extraction component, the training module being configured to interpolate values into zero-valued cells in the connectivity matrix and provide deep learning architecture training data based on the connectivity matrix;

a deep learning architecture having one or more layers, the deep learning architecture configured to receive the deep learning architecture training data and propagate the deep learning architecture training data through the one or more layers to train the one or more layers, and the deep learning architecture being configured to receive the HTTP network log and generate a general data representation of the HTTP network log; and a behavior analytics component coupled to the deep learning architecture and configured to detect a discordant network activity within the HTTP network log based on the general data representation of the HTTP network log.

2. The network security system of claim 1, wherein the deep learning architecture is a stacked autoencoder, each layer of the one or more layers being a sparse autoencoder.

3. The network security system of claim 1, wherein the behavior analytics component is configured to detect the discordant network activity in the HTTP network log by detecting a deviation from the recurring behavioral pattern.

4. The network security system of claim 3, wherein the recurring behavioral pattern is a reoccurring connection between a source Internet Protocol (IP) address and a destination IP address.

5. The network security system of claim 1, wherein the behavior analytics component is further configured to classify contents of the general data representation of the HTTP network log as human-initiated activity or machine-initiated activity, and wherein the discordant activity within the HTTP network log is a first machine-initiated activity.

6. The network security system of claim 5, wherein the HTTP network log is a HTTP network log for a plurality of computer users, and wherein the behavior analytics component is further configured to group each of the plurality of computer users within one of a plurality of user classes based on the contents of the general data representation of the HTTP network log.

7. A method of monitoring network activity, the method comprising:

receiving a Hypertext Transfer Protocol (HTTP) network log for a single user, the HTTP network log including a matrix of data arranged by at least one field and a time bin;

extracting a connectivity matrix from the HTTP network log based at least in part on a recurring behavioral pattern within the matrix of data, a source Internet Protocol (w) address of the single computer user, one or more destination IP addresses, and the time bin, wherein a value within each cell of the connectivity matrix indicates a number of connections between at least the source IP address of the single computer user and an individual destination IP address of the one or more destination IP addresses;

interpolating values into zero-valued cells in the connectivity matrix;

providing deep learning architecture training data to a deep learning architecture, the deep learning architecture training data being based on the connectivity matrix;

receiving the deep learning architecture training data at the deep learning architecture, and propagating the deep learning architecture training data through one or more layers of the deep learning architecture to train the one or more layers;

at the deep learning architecture, generating a general data representation of the HTTP network log; and detecting a discordant network activity within the HTTP network log based on the general data representation of the HTTP network log.

8. The method of claim 7, further comprising classifying contents of the general data representation of the HTTP network log as human-initiated activity or machine-initiated activity, and wherein the discordant activity within the HTTP network log is a first machine-initiated activity.

9. The method of claim 7, wherein receiving the HTTP network log includes receiving a HTTP network log for a plurality of computer users.

10. The method of claim 9, furthering comprising grouping each of the plurality of computer users within one of a plurality of user classes based on the contents of the general data representation of the HTTP network log.

11. The method of claim 7, wherein detecting the discordant internet activity in the HTTP network log includes detecting a deviation from the recurring behavioral pattern.

12. The method of claim 11, wherein the recurring behavioral pattern is a reoccurring connection between a source Internet Protocol (IP) address and a destination IP address.

* * * * *

UNITED STATES PATENT AND TRADEMARK OFFICE
CERTIFICATE OF CORRECTION

PATENT NO. : 10,749,882 B2  
APPLICATION NO. : 15/957221  
DATED : August 18, 2020  
INVENTOR(S) : John Grothendieck et al.

Page 1 of 1

It is certified that error appears in the above-identified patent and that said Letters Patent is hereby corrected as shown below:

In the Claims

Column 18, Claim 7, Line 4, delete "Protocol (w)" and insert -- Protocol (IP) --.

Signed and Sealed this  
Twenty-second Day of September, 2020

Andrei Iancu  
*Director of the United States Patent and Trademark Office*